March 1, 1966  H. B. CARR ETAL  3,237,643
DOUBLE DISC GATE VALVE WITH SEPARATE BONNETS
Filed March 13, 1962

INVENTORS.
HUGH B. CARR and
SELWYNE P. KINNEY
By Christy, Parmelee, & Strickland Attorneys United States Patent Office 3,237,643
Patented Mar. 1, 1966

3,237,643
DOUBLE DISC GATE VALVE WITH
SEPARATE BONNETS
Hugh B. Carr, Carnegie, and Selwyne P. Kinney, Pittsburgh, Pa., assignors to S. P. Kinney Engineers, Inc., Carnegie, Pa., a corporation of Pennsylvania
Filed Mar. 13, 1962, Ser. No. 179,346
1 Claim. (Cl. 137—614.11)

This application relates generally to a gate valve and more particularly to a valve having disc gates with stems attached, the stems and disc gates being housed in the valve body and bonnet in separated chambers such that leakage from one side of the valve to the other is avoided.

This is a continuation-in-part application of application Serial No. 69,378 filed November 15, 1960, now Patent No. 3,113,581, for a Double Disc Shut-off Valve by Hug B. Carr and Selwyne P. Kinney, which is assigned to the same assignee as is the present application.

In the steelmaking industry gate valves of the general nature of the copending application are utilized to isolate a stove of a blast furnace from a gas main, and in this environment the double-disc gate valve must be designed to withstand pressures and temperatures of the magnitude of 50 lbs. or more per square inch and 1000° F., respectively. These valves are built to rigid specifications to ensure against leakage past the valve when fully closed across a line or conduit. However, the pressures and temperatures encountered in blast furnace stove operations are so elevated that the typical gate valves leak, thus lowering the effectiveness of the valve and introducing a safety hazard to personnel and equipment.

It is a principal object of this invention to provide a gate valve constructed with separate stem and valve disc chambers and with an individual bonnet for each chamber whereby the valve is rendered leakproof.

Another object is to provide a gate valve with a body divided into chambers with bonnets for each such that maintenance can be performed on either side of the valve without disturbing the other.

Still another object is the provision of a double disc valve where gases under high pressure in a conduit are effectively blocked by the valve discs when in closed condition.

A complete understanding of the invention may be had from the following detailed description of a specific embodiment thereof when read in conjunction with the appended drawings wherein.

Figure 1:
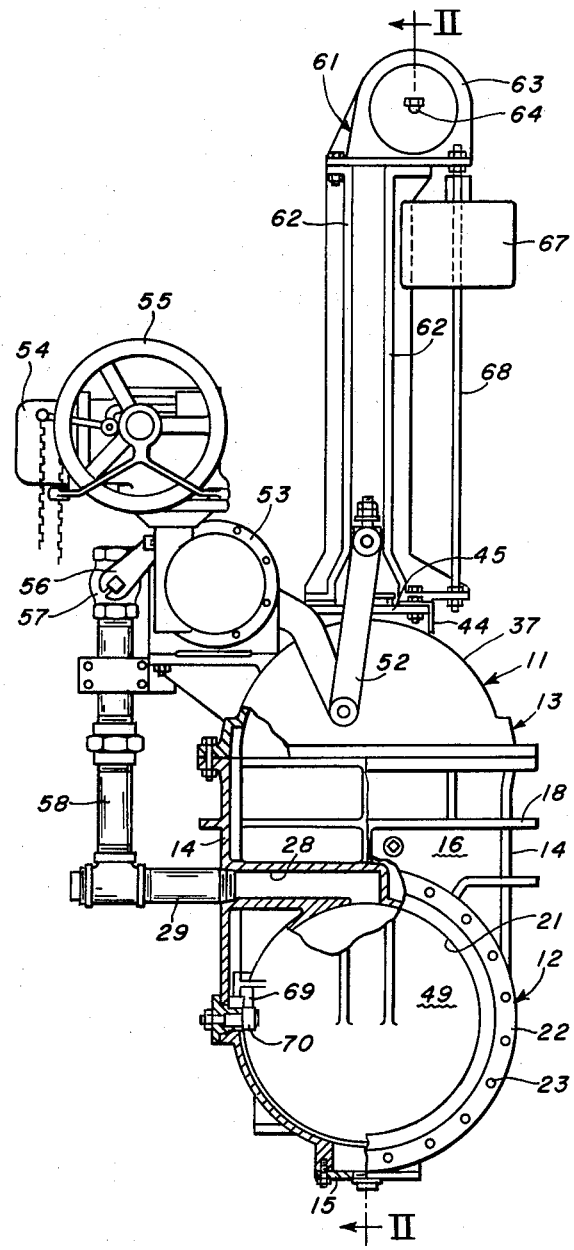
FIG. 1 is a front elevational view of the valve, partly in section.
Figure 2:
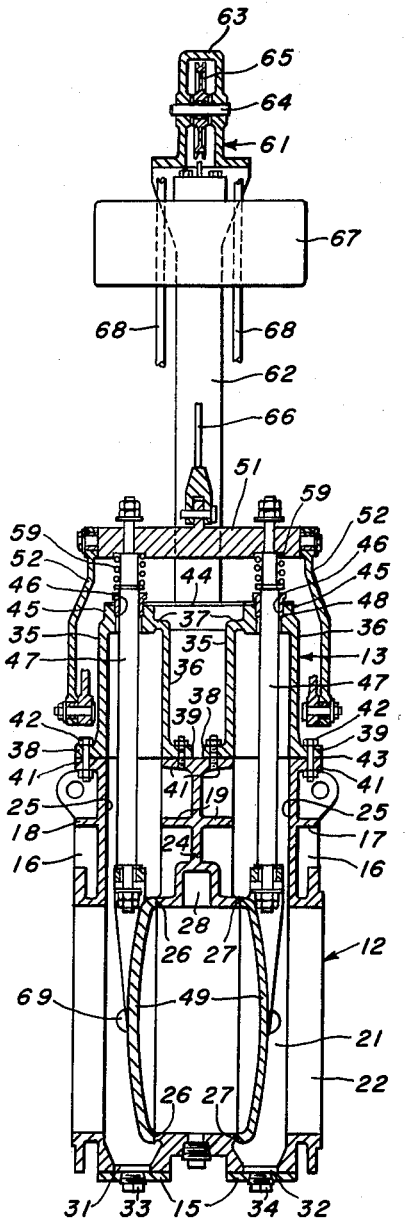
FIG. 2 is a cross section of the valve taken along the line II—II of FIG. 1.

Referring now to the drawings, wherein like reference characters designate like or corresponding parts throughout the views, there is shown in FIG. 1, which illustrates a preferred embodiment, a gate valve 11 having a body 12 and a bonnet 13. The valve body 12 has a rectangular open top defined by side walls 14 which are connected by a bottom wall 15, and front and back walls 16. The upper portions of the side, front and back walls are reinforced by ribs 17, 18 and central ribs 19. Extending through the lower portion of the valve body 12 is an annular orifice 21 through the front and back walls 16. An annular flange 22 is provided at the outer terminal of the orifice 21 and contains bolt apertures 23 for mounting the valve in a conduit, not shown, of a cross-section equal to that of the orifice 21.

A vertical partition wall 24 lying in a plane intermediate the body front and back walls 16 divides the valve body 12 into two substantially equal chambers 25 within which move the valve discs and stems. Annular valve disc seats 26 and 27 are provided on the opposed faces of the partition wall 24 and are machine finished for sealingly seating of the valve discs thereagainst. A gas vent passageway 28 is located adjacent the top of the valve annular orifice 21 and is formed integrally with the partition wall 24 to open into the valve orifice 21 between the valve disc seats 26 and 27. The gas vent passageway 28 extends through one side wall 14 and is threaded at this location for connection with a vent pipe nipple 29. Suitable drain openings 31 and 32 pass through the valve body bottom wall 15 and are closed by plugs 33 and 34.

The valve bonnet 13 is made in two sections, one covering each body chamber 25. Spaced front and back walls 35 and 36 of each bonnet section are aligned with the corresponding valve body wall 16 and 24 and each pair of walls 35 and 36 is connected by an arcuate side wall 37. Walls 35 and 36 terminate in flanges 38 and 39, which are connected to matching flanges 41 of the body walls 16 and 24 by bolts 42, for example. A suitable gasket 43 of asbestos, for example, is sandwiched between the flanges of the bonnet sections and the body flanges to which attached.

A support angle bar 44 is fastened to the flattened top 45 of each section of bonnet 13 to space fixedly the two sections of the bonnet apart and to support operating elements. Apertures 46 pass vertically through the flattened top of the arcuate side wall 37 of the bonnet 13 for receiving slidably the valve stems 47 within a suitable packing gland and bushing unit 48. The lower end of each valve stem 47 is connected to a valve gating disc 49 for vertical reciprocal movement and the upper end of each stem is fastened in common to a yoke 51. As described in the copending application, the yoke 51 is connected through linkage arms 52 to an operating member 53 which may be driven either by a motor 54 or by a hand-operated wheel 55. Connected to the operating member 53 and the linkage arms 52 is a lever 56 for operating a relief valve 57 in a vent pipe 58 connected to the nipple 29. The relief valve 57 is opened and closed responsive to the movement of the yoke 51, which in turn opens or closes selectively the valve orifice 21 by the discs 49 vertically moving with the stems 47 into and out of the chambers 25. The vent gas relief valve 57 is closed when the discs are raised and the gate valve 11 is open, and opened when the discs are lowered and the gate valve 11 is closed, respectively, in order that gas trapped between the discs 49 may escape harmlessly to the atmosphere. Springs 59 axially positioned on the stems 47 cushion the yoke 51 from shock as the yoke 51 closes on the top 45 of the bonnet 13.

A guide stand 61 is mounted above the yoke 51 on the support angle bar 44 by a pair of opposed yoke guides 62. The stand 61 includes a bracket 63 which supports a shaft 64 on which is rotatively mounted a sheave 65. A cable 66 is fastened at one end to the yoke 51 and is entrained over the sheave and fastened at its other end to a counterweight 67. Keeper rods 68 connected to the stand 61 and to the flange of the guide 62 pass through the counterweight 67 to maintain a positive path of travel for the weight for safety purposes.

By the provision of the two section bonnet 13 for the double disc valve 11 the escape of gases from one side of the valve to the other is eliminated in the area where the sections of the bonnet are fastened by bolts 42 to the body 12 of the valve 11.

When the gate valve orifice 21 is closed by the seating of the discs 49 urged against seats 26 and 27 by a cam surface 69 on each disc in contact with a roller 70, either chamber 25 and its related stem and disc may be exposed without hazard by removal of the bonnet section associated with that chamber, thus, necessary repair or maintenance operations may be performed by personnel by maintaining one side of the valve completely closed. This is particularly important in blast furnace stove usage where one side of the valve is coupled to a stove operating under high gas pressure, and the other side is coupled to a high pressure gas main, and the stove is serviced periodically. While the stove is off, the valve section connected thereto may be serviced without disturbing the connection of the gas main to the valve. Additionally, the valve structure is leakproof when in normal gating operation.

What is claimed is:

A gate valve structure for use in a main through which gas flows when the valve is open and in which air under pressure is blocked by the valve at one side when the valve is closed and gas under pressure is blocked on the other side, said valve comprising a body having a passageway therethrough with a seat portion having spaced oppositely facing seat rings thereon, a single integral extension on the body above the passageway having two separate chambers therein with in intervening partition wall between them, a separate hood on the top of said body sealed thereto and separately fastened thereto over each chamber and forming within it a continuation of the chamber above which it is positioned, each hood being spaced from the other so that leakage around either is into the atmosphere, a valve gate in the body confronting each seat and movable transversely of the passageway through the body from a lower sealing position to an open position where it is entirely within the chamber and its bonnet and out of the passageway, a separate operating rod attached to each valve gate extending upwardly therefrom through the bonnet, each bonnet having a seal through which the rod passes, and an operating means for reciprocating each valve stem, valve controlled means for venting gases from the passageway between the two valve gates when the valve is closed whereby each gate when seated is subject to differential pressure between that face which is turned away from the seat and the pressure of the gases in the vented space betwen the valve seats, said bonnets being spaced from each other on the body whereby leakage between the body and hood at one side can never escape into the chamber of the other hood.

References Cited by the Examiner

UNITED STATES PATENTS

| | | | |
|---|---|---|---|
| 1,482,759 | 2/1924 | Meyers | 137—614.11 X |
| 1,532,781 | 4/1925 | Schneider | 137—614.11 |
| 3,113,589 | 12/1963 | Carr | 137—614.11 |

ISADOR WEIL, *Primary Examiner.*

WILLIAM F. O'DEA, *Examiner.*